United States Patent [19]

Smidler

[11] Patent Number: 5,752,798
[45] Date of Patent: *May 19, 1998

[54] AUTO HAULING VAN

[75] Inventor: Francis S. Smidler, Lafayette, Ind.

[73] Assignee: Wabash National Corporation, Lafayette, Ind.

[*] Notice: The term of this patent shall not extend beyond the expiration date of Pat. No. 5,730,578.

[21] Appl. No.: 389,205

[22] Filed: Feb. 15, 1995

[51] Int. Cl.$^6$ ........................................... B60P 1/00
[52] U.S. Cl. ...................... 414/475; 410/4; 410/24; 414/495; 414/786
[58] Field of Search .................. 414/474–476, 414/482, 333, 495, 786, 537; 410/4, 24, 77, 81; 187/214, 216, 244, 252, 267, 268

[56] References Cited

U.S. PATENT DOCUMENTS

| 448,788 | 3/1891 | Pratt | 187/252 |
|---|---|---|---|
| 2,659,318 | 11/1953 | Steins et al. | 414/495 X |
| 2,789,714 | 4/1957 | Norris | 414/475 |
| 2,843,223 | 7/1958 | Villars | 187/214 X |
| 3,043,454 | 7/1962 | Butler et al. | 410/26 |
| 3,303,950 | 2/1967 | Jones | 414/475 |
| 4,230,432 | 10/1980 | Howell | 410/81 X |
| 4,413,943 | 11/1983 | Liljestrom | 414/475 |
| 4,685,721 | 8/1987 | Banerjea | 296/181 |
| 4,701,086 | 10/1987 | Thorndyke | 410/26 |
| 4,746,261 | 5/1988 | Landoll et al. | 414/475 |
| 4,801,229 | 1/1989 | Hanada et al. | 410/26 |
| 4,806,061 | 2/1989 | Fenton | 414/475 |
| 4,810,027 | 3/1989 | Ehrlich | 296/181 |
| 4,865,510 | 9/1989 | Wegner | 414/476 X |
| 4,881,859 | 11/1989 | Ehrlich | 410/29.1 |
| 4,944,646 | 7/1990 | Edwards et al. | 414/476 X |
| 5,024,576 | 6/1991 | Meschi | 414/495 X |
| 5,040,466 | 8/1991 | Wicks et al. | 105/4.3 |
| 5,051,046 | 9/1991 | Oren | 410/29.1 |
| 5,375,532 | 12/1994 | Larson, Jr. | 105/72.2 |

FOREIGN PATENT DOCUMENTS

| 295969 | 11/1967 | Australia | 414/333 |
|---|---|---|---|
| 0233004 | 8/1987 | European Pat. Off. | |
| 2544700 | 10/1984 | France | 414/475 |
| 8801783 | 2/1990 | Netherlands | 414/475 |
| 8800538 | 1/1988 | WIPO | 414/495 |
| 8808385 | 11/1988 | WIPO | 414/495 |
| 9402337 | 2/1994 | WIPO | 414/495 |

*Primary Examiner*—David A. Bucci
*Attorney, Agent, or Firm*—Trexler, Bushnell, Giangiorgi & Blackstone, Ltd.

[57] ABSTRACT

A trailer for hauling cargo, such as general freight, cars, small trucks and the like, has a deck element therein. The deck element is capable of being raised or lowered by a lifting assembly to a variety of positions within the trailer and can be secured to side walls of the trailer by cammed bracket members. A guide assembly is provided to prevent forward and rearward movement of the deck element during transportation of the trailer. The trailer can be tilted backwards until a back end of the trailer contacts the ground so that cargo can be easily loaded into the trailer. Cargo can be loaded onto the deck element and underneath the deck element on the floor of the trailer.

32 Claims, 10 Drawing Sheets

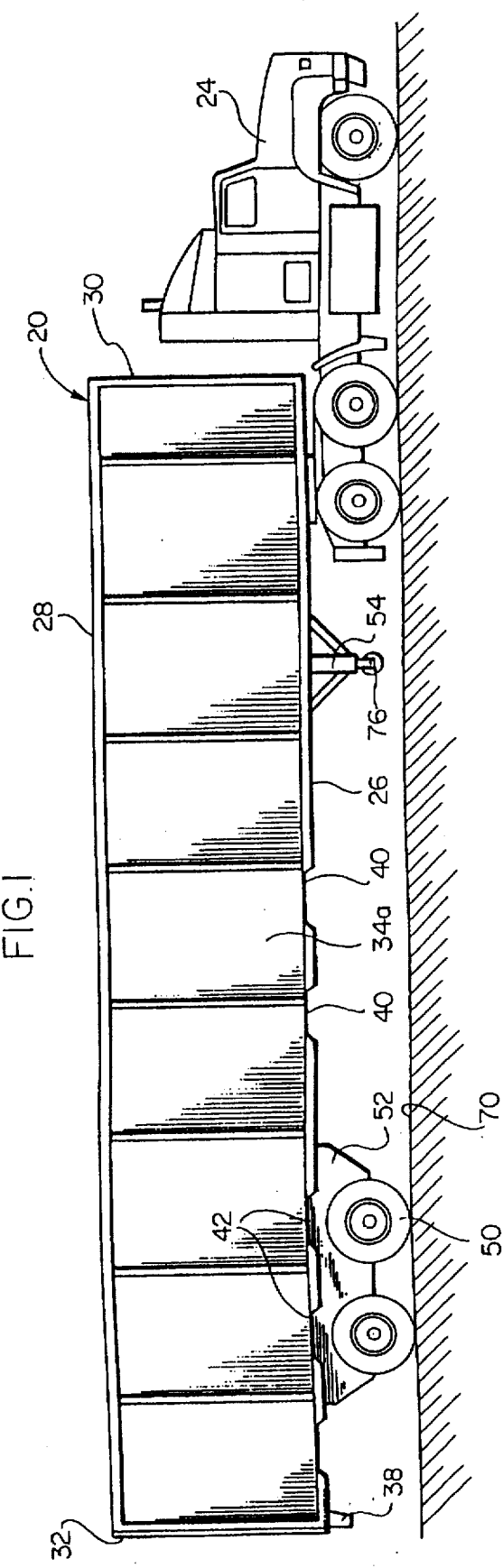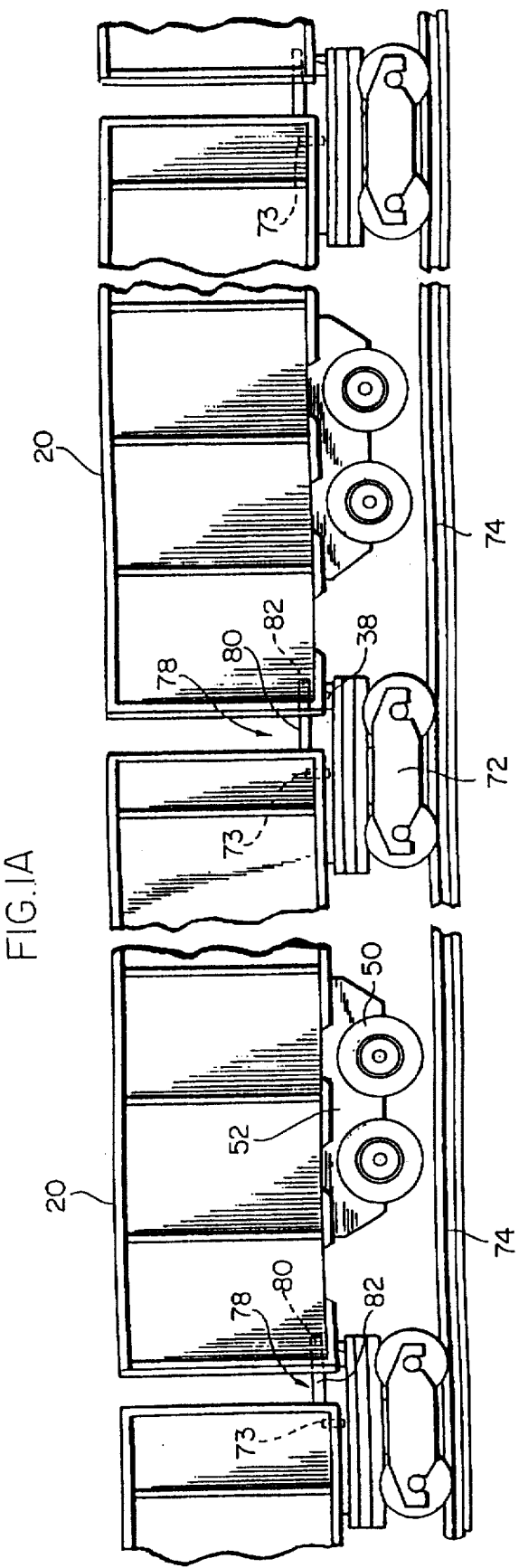

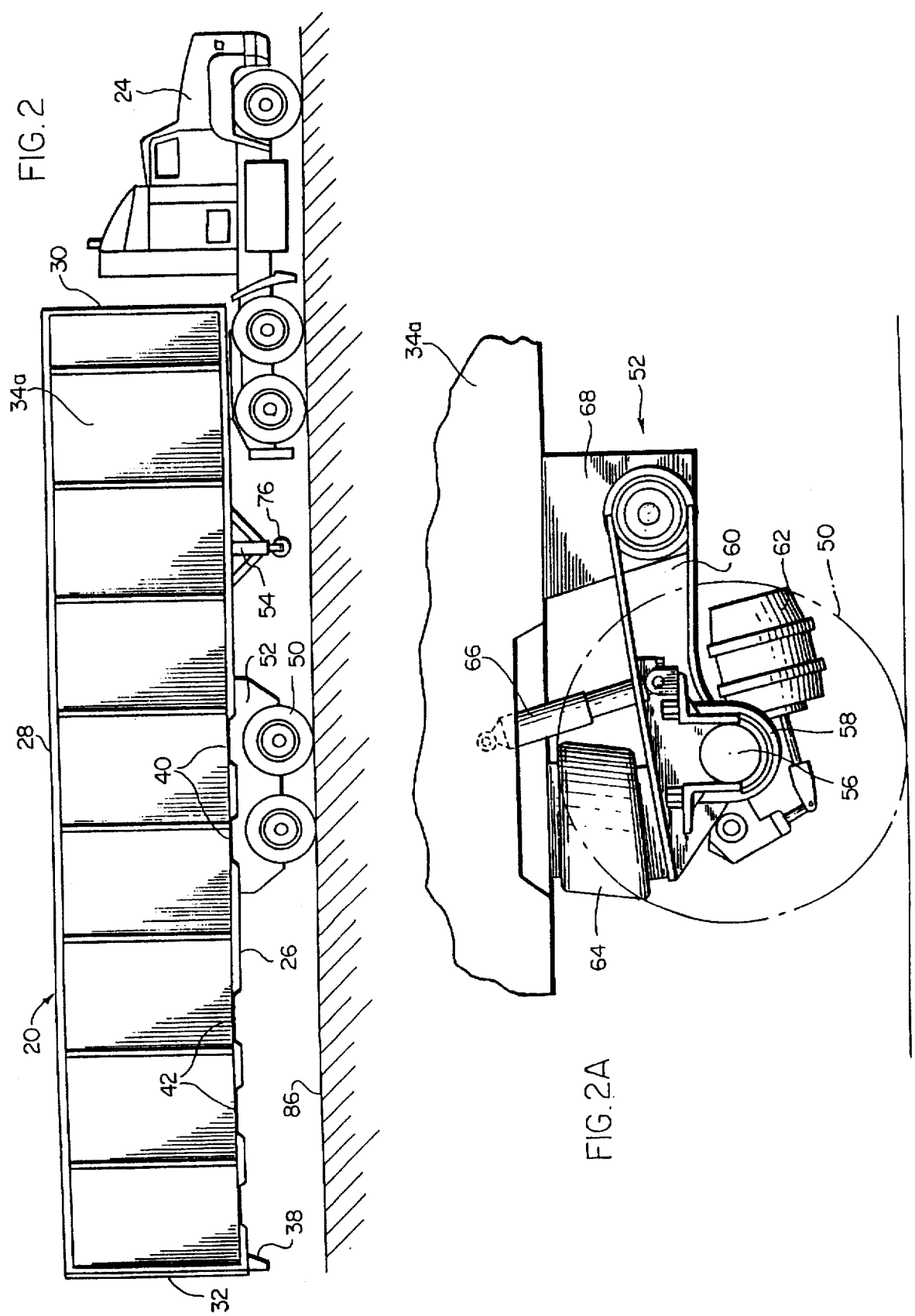

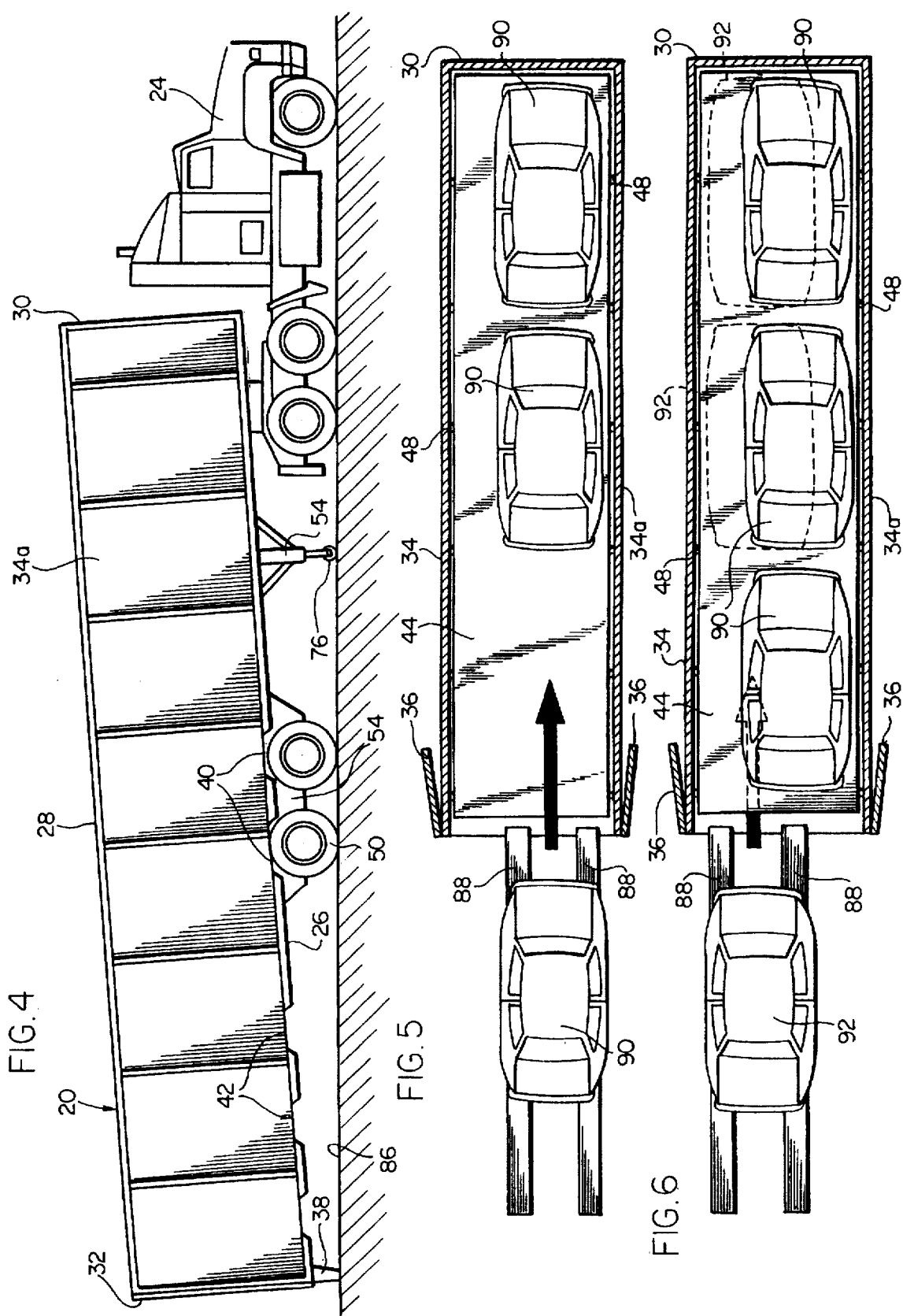

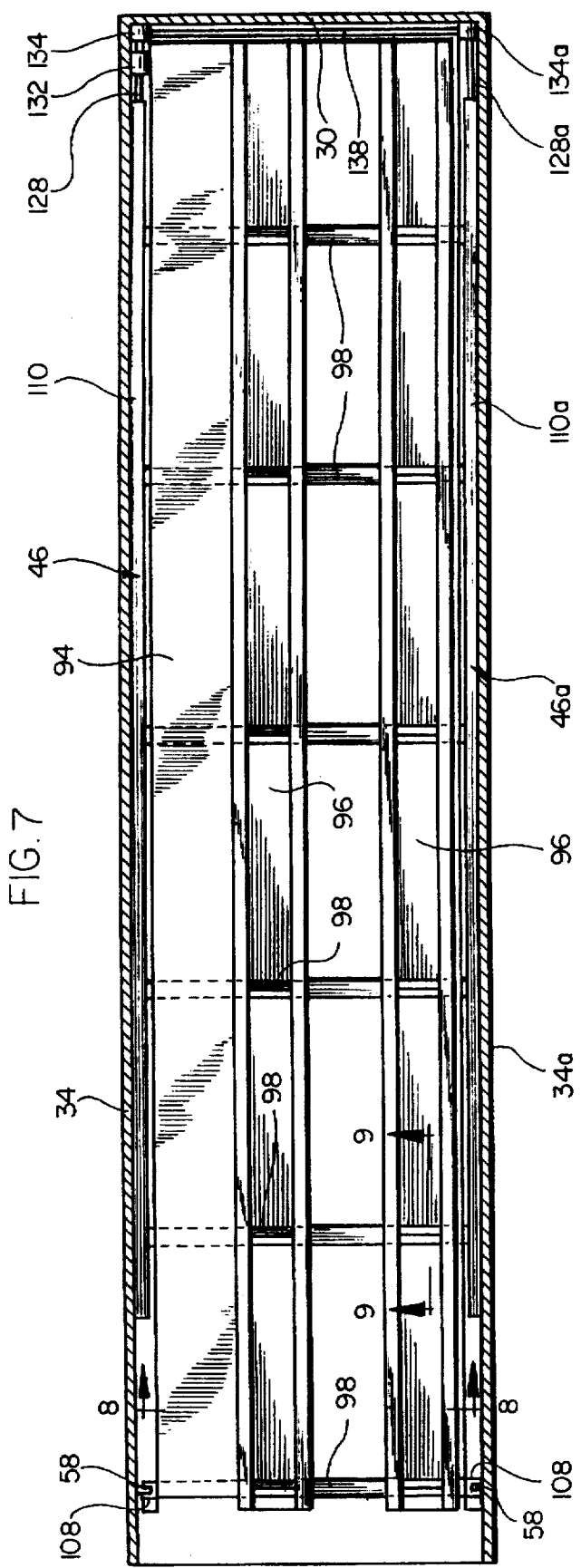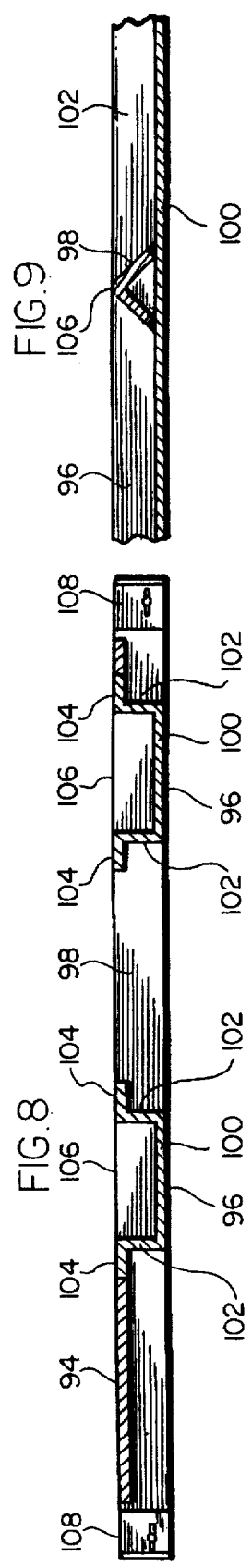

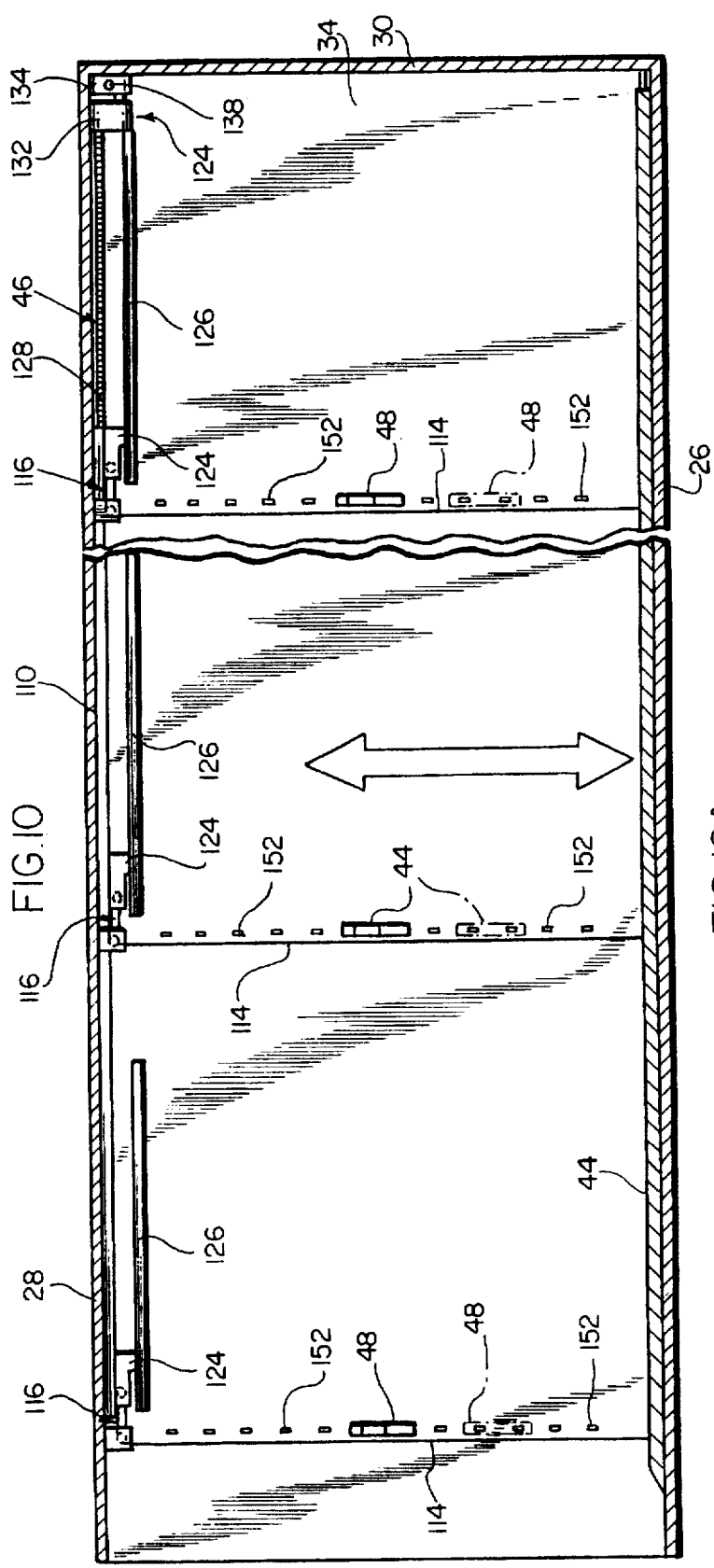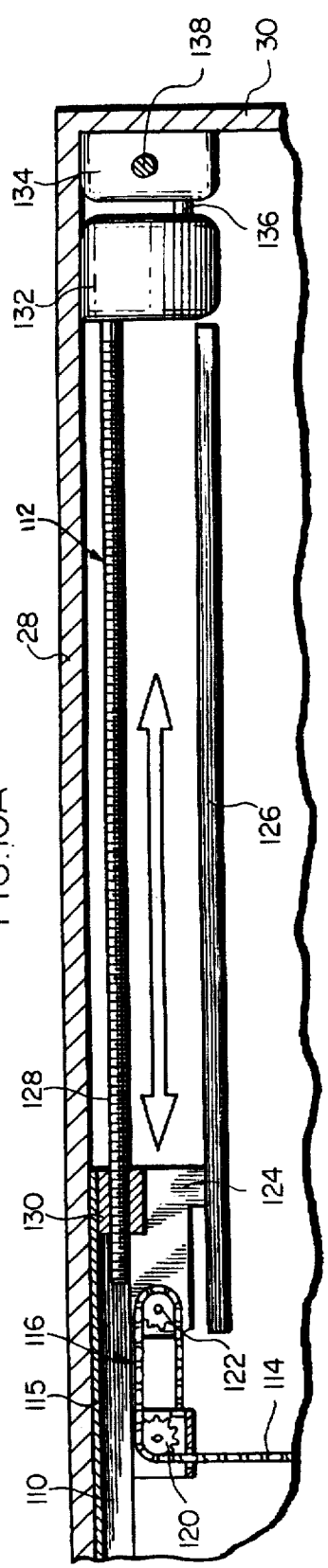
FIG.10
FIG.10A

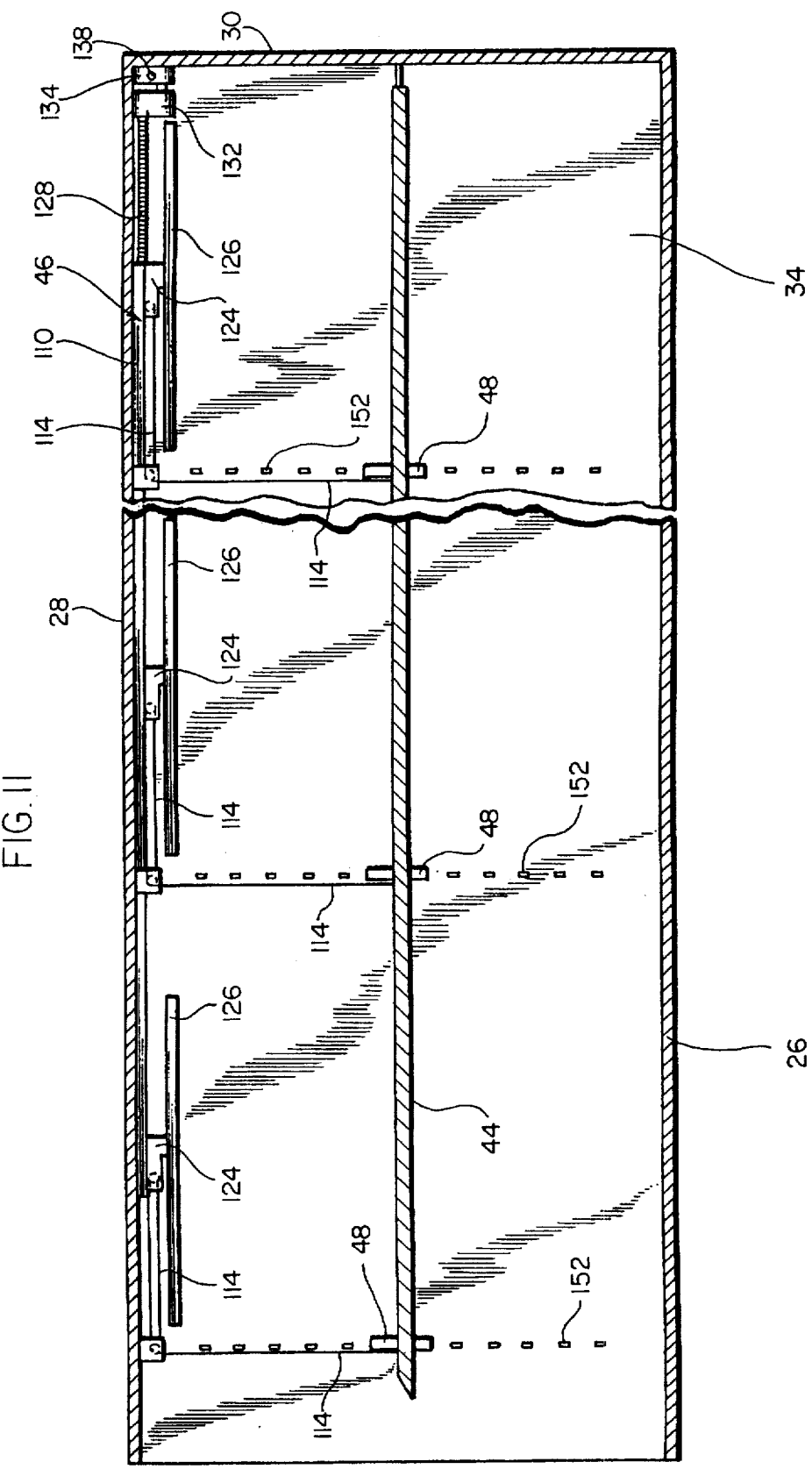

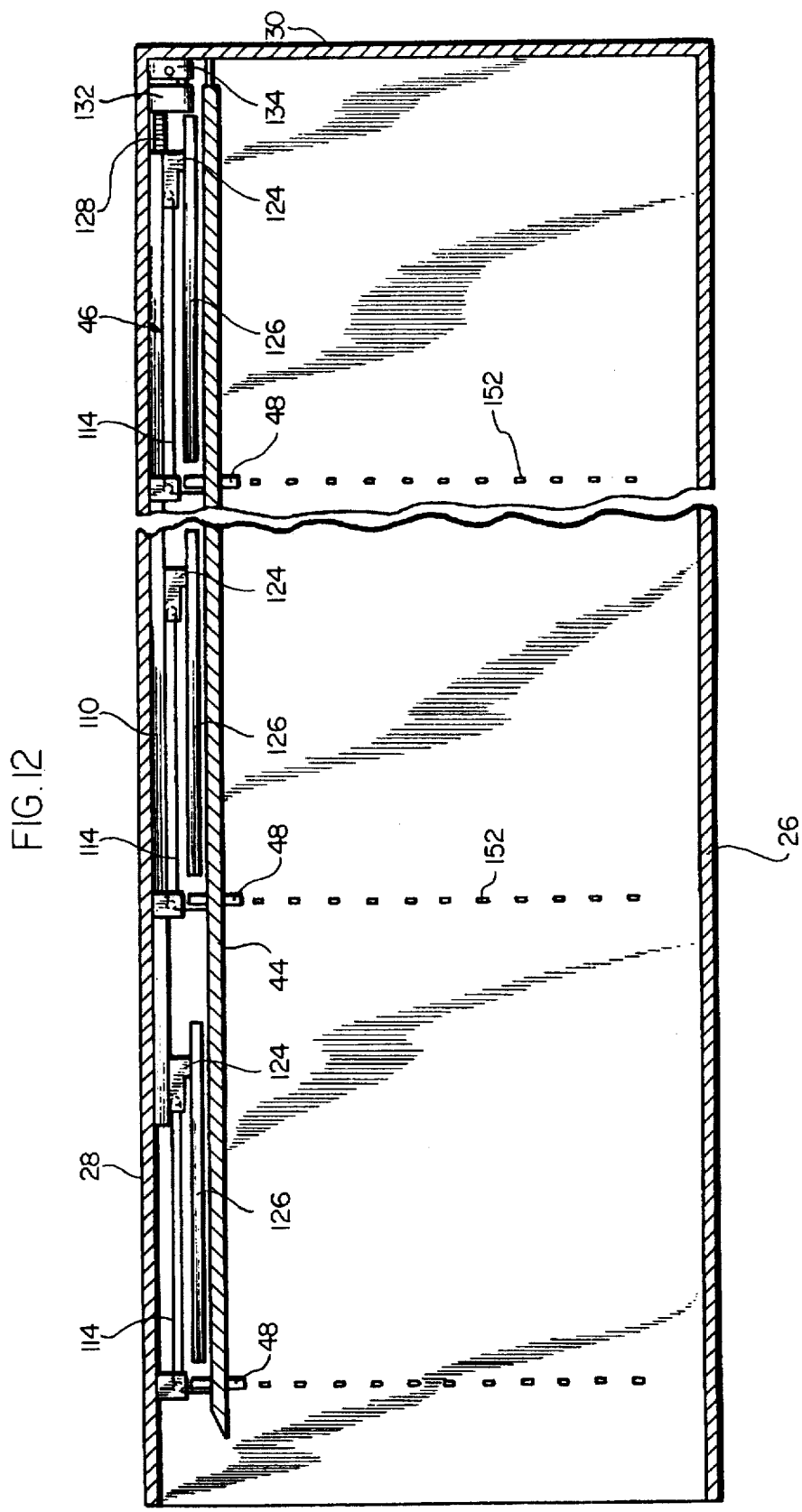

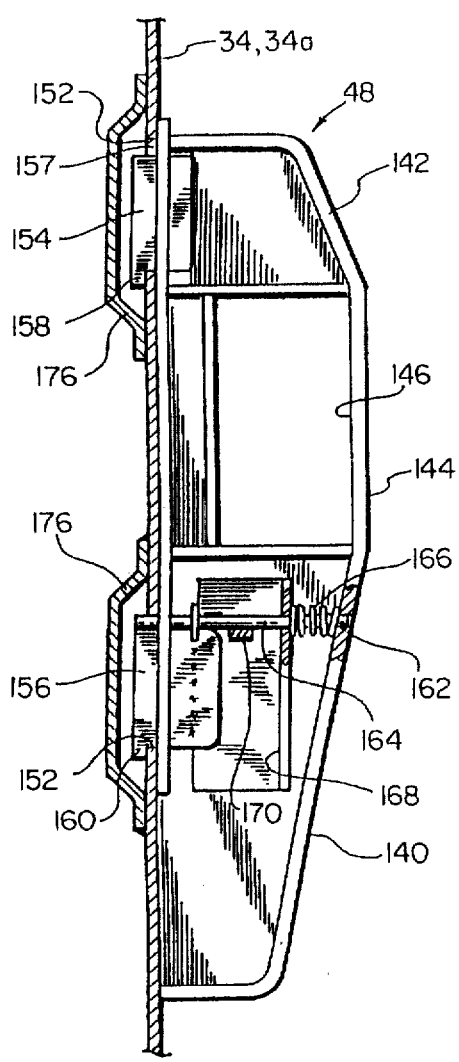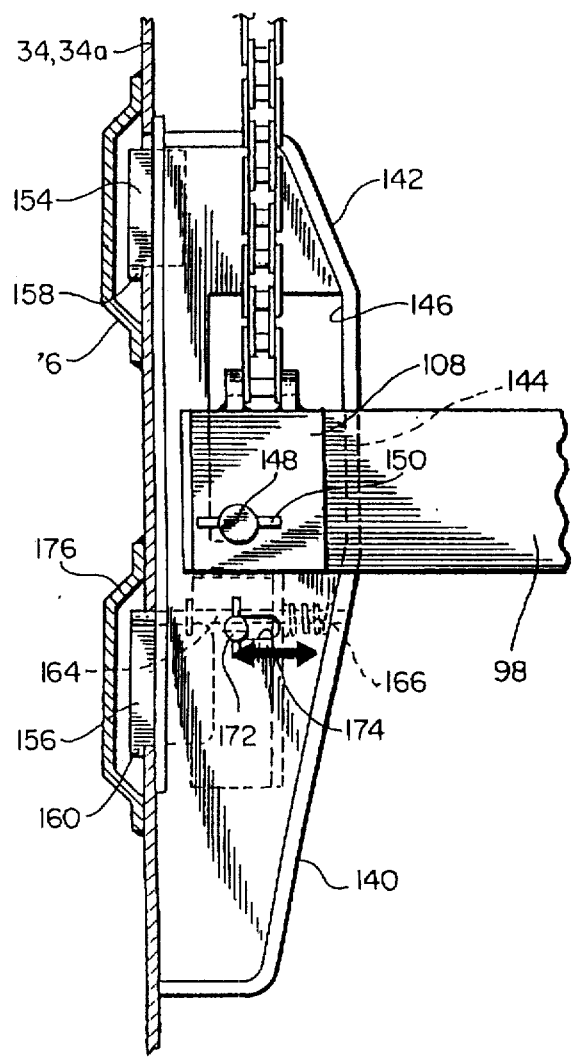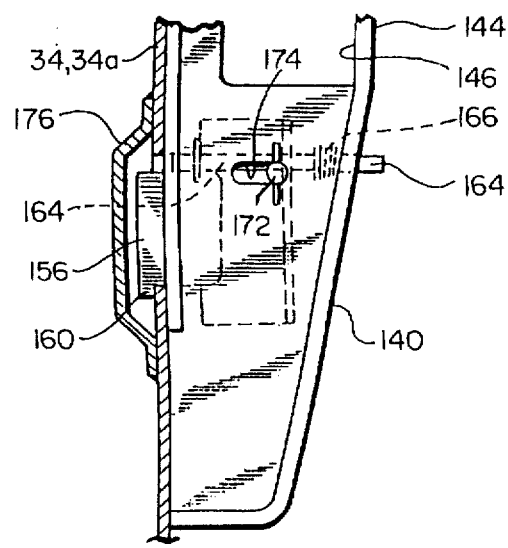

AUTO HAULING VAN

BACKGROUND OF THE INVENTION

This invention is generally directed to a novel van-type trailer for hauling general freight, automobiles, small trucks and the like over the road or by rail. More particularly, the invention contemplates a van-type trailer which can be efficiently adapted to carry a variety of cargo, such as automobiles, general freight and the like for transporting the same.

In a conventional shipping procedure, when cars or the like are manufactured at a manufacturing plant, the cars must be loaded onto a trailer to transport the cars over the road. If the cars are to be shipped a great distance, to minimize costs, the cars are usually shipped by rail. To ship by rail, the cars are offloaded from the trailer and reloaded onto a rail car. To reach the final destination, such as the dealer's place of business, the cars are offloaded from the rail car and reloaded onto another trailer which drives the cars to the final destination.

The trailers which are designed to transport and carry cars are usually an open truss configuration which is specifically designed to carry cars. Often, cars are shipped from one side of the country to the other side of the country, for example from Detroit, Mich. to Los Angeles, Calif. Once the cars are offloaded in California, the manufacturer usually desires to transport a load of cargo back across the country to efficiently use the trailer. Since the trailer is specifically designed to transport cars, only cars can be transported back to Detroit and other types of goods, such as general freight cannot be transported on the trailer. With this type of trailer, the trailer is often driven back across the country empty, therefore wasting gasoline and operator time.

This shipping procedure can cause delays and possible damage to the cars due to the repeated loading and unloading of the cars onto trailers and rail cars.

The procedure is also labor intensive which increases the costs of transporting the cars. Additionally, the open truss configuration exposes the cars to the outside elements and possible damage by debris on the roads.

The novel van-type trailer of the present invention is intended to prevent or minimize these problems, as well as to present several improvements and advantages over prior art trailers.

OBJECTS AND SUMMARY OF THE INVENTION

A general object of the present invention is to provide a novel van-type trailer which efficiently transports general freight, cars, trucks or the like.

An object of the present invention is to provide a trailer which reduces costs of transporting cargo.

Another object of the present invention is to provide a novel trailer structure and method for loading and unloaded cargo in the trailer.

Briefly, and in accordance with the foregoing, the present invention discloses a novel van-type trailer for hauling or transporting cargo, such as general freight, cars, small trucks and the like. The trailer has a floor, a top, side walls extending between the floor and the top, a front wall and rear doors. Wheels are attached underneath the floor by a highway suspension system and a landing gear is attached underneath the floor forward of the trailer's center of gravity. A deck element is mounted inside the trailer and is capable of being raised or lowered within the trailer by a lifting assembly.

The deck element includes lift beams which are parallel to each other and a plurality of cross beams which are parallel to each other and perpendicular to the lift beams. The lift beams and the cross beams are secured to each other by suitable means. The deck element further includes a walkway along which an operator can walk to enter or exit the trailer. The walkway is parallel to the lift beams and is secured to the cross beams.

The lifting assembly includes a tension bar member connected to each side wall of the trailer, a threaded screw, an internally threaded nut, a motor and connecting members, preferably chains, which connect the tension bar and the deck element together. The screw is connected to the tension bar member and to the motor. The nut is attached between the tension bar member and the screw. The nut is affixed to and nonrotatable with respect to the tension bar member. The screw is rotatable with respect to the nut. The motor rotates the screw which, due to the thread engagement between the screw and the nut, causes the tension bar member to translate relative to the side wall of the trailer towards an end of the trailer which, in turn, causes the chains to retract and lift the deck element upwardly from the floor of the trailer. The lifting assembly is also used to lower the deck element by the motor rotating the screw in the opposite direction thus causing the tension bar member to translate towards the opposite end of the trailer.

Initially, the deck element abuts and rests against the floor of the trailer and the weight of the deck element rests thereupon. When the deck element is raised by the lifting assembly, the cross beams are secured to cam brackets on the side walls of the trailer to minimize the amount of weight on the chains in the lifting assembly. Each bracket has a locking mechanism thereon which locks and secures the bracket to the side wall of the trailer to prevent the bracket from inadvertently detaching from the side wall.

To load the van-type trailer with cargo, the wheels of the trailer are locked against rotation by a conventional brake. The trailer is driven backwards to move the suspension system and wheels forwardly to approximately the midpoint of the trailer, but preferably behind the trailer's center of gravity.

Thereafter, the suspension system is disengaged to tilt the rear end of the trailer towards the ground around the suspension system. The suspension system may be a conventional suspension system which includes an air bag between the floor and the wheels of the trailer for permitting relative up-and-down movement between the trailer and the wheel axle. To disengage the suspension system, air is released from the air bag. The landing gear is lowered to the ground to further tilt the rear end of the trailer around the suspension system and towards the ground until the rear end of the trailer contacts the ground.

After the trailer has been tilted, ramps are placed between the inside of the trailer and the ground. Cargo is then loaded onto the deck element. Thereafter, the deck element is raised by the lifting assembly to a height sufficient to load cargo underneath the deck element and is secured to the side walls of the trailer via the cam brackets. Cargo is then loaded onto the floor of the trailer underneath the deck element. If desired, the cargo can be loaded in the trailer with the cargo on the deck element offset to one side of the trailer and cargo on the floor offset to the other side of the trailer from which the cargo on the deck element is loaded.

Alternatively, the deck element can be raised to be generally proximate to the top of the trailer without any cargo being loaded onto the deck element. If the deck element is raised to the top of the trailer, cargo is loaded onto the floor of the trailer. In this configuration, sufficient unobstructed room is provided within the interior of the trailer for general freight or the like.

The cargo in the trailer can be unloaded using the same tilting procedure as for loading cargo onto the trailer.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 1 is a side elevational view of a van-type trailer and a tractor connected thereto which incorporates features of the invention with the wheels of the trailer in a first position in which the trailer can be driven over the roads;

FIG. 1A is a partially fragmented, side elevational view of a plurality of van-type trailers in accordance with in FIG. 1 mounted on rail bogeys on which the trailers can be transported over the rail;

FIG. 2 is a side elevational view of the van-type trailer and tractor shown in FIG. 1 with the wheels of the trailer in a second position;

FIG. 2A is a side elevational view of a suspension system for the wheels of the van-type trailer with the suspension system in an inflated configuration when the wheels of the trailer are in the positions shown in FIGS. 1 and 2;

FIG. 4 is a side elevational view of the van-type trailer and tractor shown in FIG. 1 with the landing gear extended to the ground and the back bumper guard on the rear end of the trailer contacting the ground;

FIG. 5 is a cross-sectional view of the van-type trailer which shows the loading sequence for a first set of cars, which are shown in top plan view, to be loaded into the trailer;

FIG. 6 is a cross-sectional view of the van-type trailer which shows the loading sequence for a second set of cars, two of which are shown in phantom outline and one of which is shown in top plan view, to be loaded into the trailer with the first set of cars shown in FIG. 5 in top plan view;

FIG. 7 is a cross-sectional view of the van-type trailer showing a top plan view of a deck assembly which incorporates features of the invention within the trailer;

FIG. 8 is cross-sectional view of the deck assembly along line 8—8 in FIG. 7;

FIG. 9 is cross-sectional view of the deck assembly along line 9—9 in FIG. 7;

FIG. 10 is a cross-sectional view of the van-type trailer showing the deck element and lifting assembly with the deck element in a lowered position;

FIG. 10A is an enlarged, side elevational view of the lifting assembly and a driving mechanism for the lifting assembly which incorporates features of the invention for raising or lowering the deck element;

FIG. 11 is a cross-sectional view of the van-type trailer showing the deck element and lifting assembly similar to FIG. 10 with the deck element in a raised position;

FIG. 12 is a cross-sectional view of the van-type trailer showing the deck element and lifting assembly similar to FIG. 10 with the deck element in an alternate raised position;

FIG. 13 is a side elevational view of a cam bracket which incorporates features of the present invention with the bracket being locked to the trailer side wall, which is shown in cross-section, for securing the deck to the trailer side walls;

FIG. 14 is a side elevational view of a cam bracket similar to the one shown in FIG. 13 with the deck element secured thereto;

FIG. 15 is a fragmentary, side elevational view of the bracket shown in FIG. 14 in an unlocked position;

DETAILED DESCRIPTION OF THE PREFERRED EMBODIMENT

Figure 3:
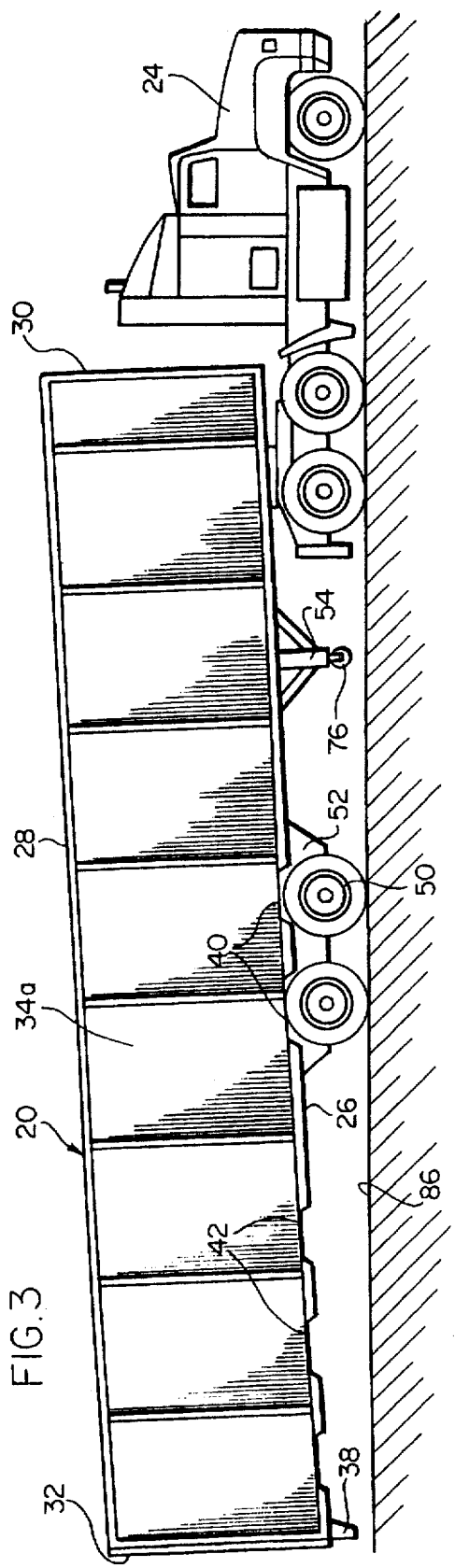
FIG. 3 is a side elevational view of the van-type trailer and tractor shown in FIG. 1 with the back end of the trailer tilted towards the ground.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

In FIG. 1, a novel van-type trailer 20 which incorporates features of the present invention is shown. The trailer 20 of the present invention is used to transport cargo, such as general freight, cars, small trucks and the like, over roads, highways and the like or by rail.

The trailer 20 of the present invention can be connected to a conventional tractor 24 by known means, such as a fifth wheel. The trailer 20 has a floor 26, a top 28, a front wall 30, a rear wall 32 and vertical side walls 34, 34a which extend between the floor 26 and the top 28 to form an elongate enclosure. The rear wall 32 has doors 36, shown schematically in FIGS. 5 and 6, to provide access into the interior of the trailer 20 so that cargo can be loaded into the trailer 20. A rear bumper guard 38 extends downwardly from the rearmost end of the trailer 20.

The side walls 34, 34a of the trailer 20 may be of various known constructions, but preferably a plate trailer construction such the one as disclosed in U.S. Pat. Nos. 4,685,721 and 4,810,027 are to be used. The structure of such plate trailer walls formed of aluminum plate is well-known and is not described herein.

The side walls 34, 34a of the trailer 20 have forward cutouts 40 which are approximately at the midpoint of the trailer 20 proximate to but preferably, slightly rearward of the trailer's longitudinal center of gravity. The trailer 20 has rearward cutouts 42 which are proximate to the rear end of the trailer 20.

The top 28 of the trailer 20 of the present invention is spaced further from the floor 26 than tops in conventional plate trailers for reasons described herein. In the trailer 20 of the present invention, the top 28 is preferably 110 inches from the floor 26.

A deck element 44, which is described in detail herein with respect to FIGS. 7–9, is positioned inside the trailer 20. The deck element 44 has a length and a width which is preferably slightly smaller than the interior length and width of the trailer 20. The deck element 44 can rest horizontally on the floor 26 of the trailer 20 or the deck element 44 can be raised or lowered to a variety of horizontal positions relative to the vertical side walls 34, 34a of the trailer 20 by a lifting assembly 46, 46a. The deck element 20 can be raised by the lifting assembly 46, 46a so as to be positioned proximate to the top 28 of the trailer 20.

When the deck element 44 is in a raised position, the deck element 44 is secured to the side walls 34, 34a of the trailer 20 by cam bracket members 48, each of which are described in detail herein with respect to FIGS. 13–15.

Figure 3A:
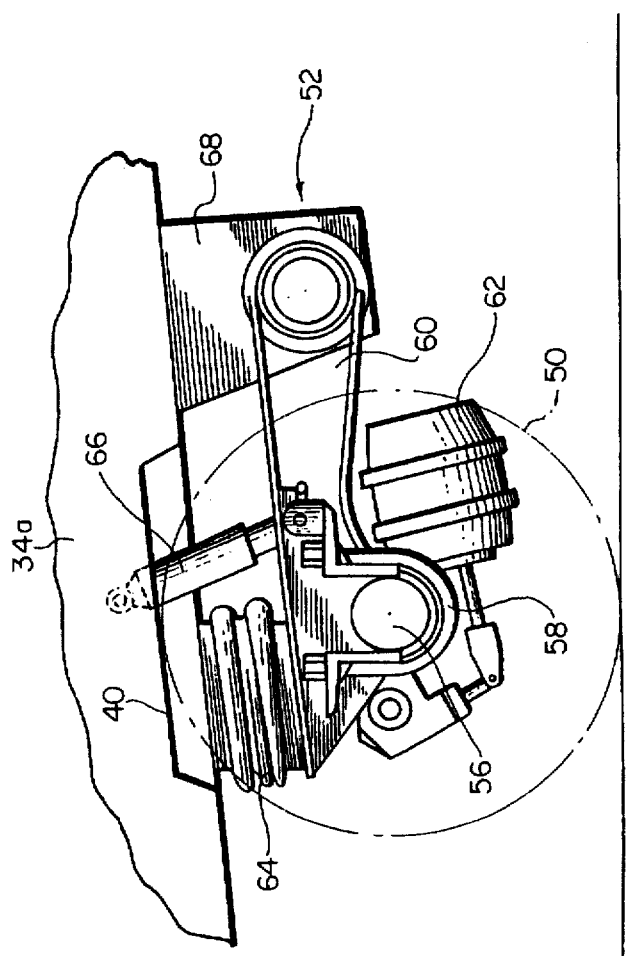
FIG. 3A is a side elevational view of the suspension system shown in FIG. 2A with the suspension system in a disengaged configuration when the rear end of the trailer is tilted towards the ground as shown in FIG. 3.

Conventional roadworthy wheels or tires 50 are attached to the underside of the floor 26 by a suitable highway suspension system 52 as described herein with respect to FIGS. 2A and 3A. A landing gear device 54 is attached to the underside of the floor 26 and is positioned approximately half way between the front end of the trailer 20 and the trailer's longitudinal center of gravity. The landing gear device 54 can be extended or retracted. During transit over the roads, the tires 50 are positioned underneath the rear cutouts 42 in the trailer 20 and the landing gear device 54 is in a retracted position as shown in FIG. 1.

A suitable, known slide frame assembly (not shown) is attached between the floor 26 and the suspension system 52. The slide frame extends from generally the rear end of the trailer 20 to the longitudinal center of gravity of the trailer 20. The slide frame assembly allows the wheels 50 and its associated highway suspension system 52 to move relative to the floor 26 for reasons described herein. Such a slide frame assembly may include a slide rail and slide pads attached between the suspension system 52 and the underside of the trailer 20. The slide frame assembly can be locked to prevent relative movement between the elements or unlocked to allow relative movement between the elements.

The suspension system 52, as shown in FIGS. 2A and 3A, includes a wheel axle 56 for carrying the tires 50 and which is supported in and can rotate freely in a U-shaped channel 58. The U-shaped channel 58 is supported by suitable means, for example bolts, at generally the end of a cantilevered lever or arm 60. The opposite end of the cantilevered arm 60 is rotatable about a fixed pivot, such as a bolt or a pin, which is attached to the slide frame assembly. Other conventional suspensions may also be used to support the wheel axle 56. A brake 62 of known structure is supplied on each wheel axle to prevent rotation of the tire 50 relative to the axle 56 upon application of the brake 62.

An air bag 64 of conventional structure is located between the slide frame assembly, and thus the floor 26 of the trailer 20, and the wheel axle 56 to permit a spring action so that relative up-and-down movement is permitted between the axle 56 and the floor 26 during transportation of the trailer 20. The air bag 64 is attached to the trailer 20 by known, suitable means. The air bag 64 is made of a flexible material which can expand or compress. A tank of compressed air (not shown) is provided on the trailer 20 and a valve (not shown) is connected between the tank and the air bag 64 so as to adjust the pressure in the air bag 64 for supporting the weight of the trailer 20. While an air bag suspension is shown, it is to be understood that other suspensions of known construction, such as a spring suspension, can be used.

A vehicle shock absorber 66 for damping out the relative up-and-down movement between the trailer 20 and the wheel axle 56 permitted by the air bag 64 has a first end connected by a pivot, such as a pin or bolt, to a plate 68 which is affixed to the slide frame assembly. The second end of the shock absorber 66 is connected to the wheel axle 56 and the cantilevered arm 60 at a pivot, such as a pin.

As shown in FIG. 1, the trailer 20 is attached to a tractor 24. When the trailer 20 is attached to the tractor 24, the trailer 20 can be driven over roads, highways 70 and the like to transport the cargo.

Alternatively, as shown in FIG. 1A, the trailer 20 can be attached to known rail bogies 72 by a suitable mechanism 73 and driven over the rail 74. An example of such a rail bogie is disclosed in U.S. Pat. No. 5,040,466. The trailer 20 is releasable from the mechanism 73 so that the trailer 20 can be driven over the roads. Adjoining trailers 20 share a rail bogey 72.

The arrangement presents a single articulated rail car since a single bogey 72 is shared between two trailers.

To move the trailer 20 up or down the rail track 74 so that trailers can be connected together, the landing gear device 54 has a railworthy flanged wheel 76 on it.

The trailers are attached to each other by a suitable coupling mechanism 78, such as a conventional no slack coupling, to form a van train. No slack couplings are well-known and are not described in detail herein. Briefly, the front end of the trailer 20 has a tongue 80 which protrudes outwardly therefrom. The rear end of the trailer 20 has a slot or socket 82 therein which is complementarily shaped to the tongue 80. The tongue 80 on the front end of the trailer 20 locks into a slot 82 on the preceding trailer 20. A tongue 80 on the front end of the following trailer locks into the slot 82 in the rear end of the trailer 20. Locking mechanisms for locking tongues in slots in a no slack coupling are well-known and are not described herein.

Now that the trailer structure has been generally described, the method for loading the trailer 20 with cargo is described. For purposes of simplicity, the loading procedure is described with respect to cars where indicated. It is to be understood that cargo other than cars can be transported in the trailer 20.

First, the wheels 50 of the trailer 20 are locked against rotation by application of the brakes 62 and the slide mechanism is unlocked. An operator drives the tractor 24 backwards, thus driving the attached trailer 20 backwards, which causes the suspension system 52 and locked wheels 50 to slide and translate forward relative to the floor 26 of the trailer 20 along the slide frame assembly.

As shown in FIG. 2, the trailer 20 is backed up until the suspension system 52 and the wheels 50 are positioned forwardly to approximately the midpoint of the trailer 20 but preferably not past the longitudinal center of gravity of the trailer 20. At this point, the suspension system 52 and the wheels 50 are positioned underneath the forward cutouts 40 on the trailer 20. When the wheels 50 are in this forward position, the rear end of the trailer 20 may tilt slightly towards the ground 86 around the suspension system 52. The trailer 20 does not completely tilt towards the ground 86 since the air bag 64 in the suspension system 52 is inflated, as shown in FIG. 2A, and maintains a predetermined spacing between the wheel axle 56 and the trailer 20.

Once the wheels 50 are positioned forwardly to approximately the midpoint of the trailer 20, as shown in FIG. 3 and 3A, the air suspension 52 is disengaged and deflated which causes the trailer 20 to pivot around the suspension system 52. The air suspension 52 may be deflated until the forward cutouts 40 on the side walls 34, 34a of the trailer 20 generally contact and rub the tires 50 of the trailer 20. specifically, as shown in FIG. 3A, the air in the air bag 64 is vented or released from the air bag 64 by suitable methods so that the trailer 20 collapses downwardly towards the cantilevered arm 60 and wheel axle 56 and pivots around the suspension system 52.

Thereafter, as shown in FIG. 4, the landing gear device 54 is extended and lowered to the ground 86. The landing gear 54 acts to tilt the trailer 20 around the fulcrum provided by the suspension system 52 and the wheels 50 the rest of the way to the ground 86 until the trailer 20 stabilizes and the rear bumper guard 38 of the trailer 20 contacts the ground 86 at which time the rear end of the trailer floor 26 is only a foot or two above the ground 86. After the rear bumper guard 38 of the trailer 20 abuts against the ground 86, an operator places short ramps 88 between the ground 86 and the lowered deck element 44 within the trailer 20, as shown in FIG. 5.

Now, the loading sequence for loading cars into the trailer 20 will be described in reference to FIGS. 5 and 6. A first set of cars 90 is first loaded onto the lowered deck element 44 which is resting on the floor 26 of the trailer 20 in a lowered position. The deck element 44 is only shown schematically in FIGS. 5 and 6 and is described in greater detail herein in reference to FIGS. 7–9. The deck element 44 is thereafter raised by the lifting assembly 46 to a raised position and a second set of cars 92 is loaded onto the floor 26 of the trailer 20 beneath the deck element 44.

As shown in FIG. 5, when the first set of cars 90 is loaded into the trailer 20 and onto the deck element 44, the ramps 88 are offset to one side of the trailer 20 and the cars 90 are driven into the trailer 20 hood-first with passenger door proximate to one side wall 34a. When the cars 90 are loaded, the cars 90 are offset to the same side of the trailer 20 as the ramps 88. Since the cars 20 are offset to one side of the trailer 20, sufficient room is provided within the trailer 20 for the operator to open his or her door and exit the car 90 and the trailer 20.

After the first set of cars 90 is completely loaded onto the deck element 44, the deck element 44 is raised to approximately the midpoint of the trailer 20, as shown in FIG. 11, by the lifting assembly 46, 46a and secured to the side walls 34, 34a of the trailer 20 via the cam bracket members 48. As illustrated in FIG. 6, the ramps 88 are moved by the operator to be offset to the other side of the trailer 20 from where the ramps 88 were in FIG. 5. The lower set of cars 92 is then driven trunk-first into the trailer 20 onto the floor 26 of the trailer 20 with the passenger side door proximate to the other side wall 34. Again, since the cars 92 are offset to one side of the trailer 20, sufficient room is provided with in the trailer 20 for the operator to open his or her door and exit the car 92 and the trailer 20.

While the above loading sequence of the cars 90, 92 is described with the first set of cars 90 being driven into the trailer 20 hood-first and the second set of cars 92 being driven into the trailer 20 trunk-first, it is to be understood that the first set of cars 90 can be driven into the trailer 20 trunk-first and the lower set of cars 92 can be driven into the trailer 20 hood-first if desired. The offsetting of the upper set of cars 90 to one side of the trailer 20 and the lower set of cars 92 to the other side of the trailer 20 aids in balancing the trailer 20 when the trailer 20 is transported over the rail. It is also within the scope of the invention that the cars 90 could be loaded into the middle of a suitable deck element which one of ordinary skill in the art could provide. The cargo in the trailer 20 can be unloaded by using the same tilting procedure as for loading cargo onto the trailer 20.

The deck element 44, as shown in FIGS. 7–9, includes a walkway 94, lift beams 96 and a plurality of cross beams 98.

The walkway 94, lift beams 96 and cross beams 98 are made of suitable, lightweight, high strength, rigid materials, such as aluminum or steel.

The lift beams 96 and the walkway 94 are parallel to each other and the lift beams 96 are offset to one side of the walkway 94. The cross beams 98 are parallel to each other and are perpendicular to the lift beams 96 and the walkway 94. The walkway 94, lift beams 96 and the cross beams 98 are secured together by suitable means, such as welding.

The lift beams 96 receive the wheels of the cars therein. The walkway 94 permits an operator access to and egress from the cars in the trailer 20.

As shown in FIG. 8, the lift beams 96 are generally U-shaped. The U-shape has a base channel or portion 100, upstanding side wall channels or portions 102 which extend upwardly from the base portion 100 and top channels or portions 104 which extend outwardly from the top of the side wall portions 102. The walkway 94 is flat and may be connected to one of the lift beams 96.

As illustrated in FIG. 9, the cross beams 98 are triangular in shape and protrude upwardly from the base portion 100 of the U-shaped lift beams 96 with the apex 106 of the triangle being generally flush with the top portions 104 of the lift beams 96. The triangular shape of the cross beams 98 permits a car to be driven safely over the cross beams 98 without damage to the car's tires.

To load the cars, each car is driven along the length of the lift beams 96 with the tires on one side of the car translating along one U-shaped channel and the tires on the other side of the car translating along the other U-shaped channel. The car is driven over the triangular cross beams 98. When the car is parked on the deck element 44 and secured by suitable, known means to the deck element 44, the tires of the car sit within the respective U-shaped lift beams 96. The ends 108 of the cross beams 98 are connected to the lifting assembly 46 as described hereinbelow.

This deck element 44 minimizes the weight in the trailer 20 since the deck element 44 is specifically designed to carry cars, trucks or the like and is not a solid sheet. While the deck element 44 described herein is configured especially for cars, trucks or the like, it is within the scope of the invention that a deck element 44 capable of accommodating a variety of cargo can be used in the trailer 20. For example, a solid sheet of metal could be used for the deck element.

The lifting assembly 46 is shown in FIGS. 7, 10, 11 and 12 and in detail in FIG. 10A. A lifting assembly 46 is provided on each side of the trailer 20 to lift the deck element 44. The lifting assembly is described with respect to the lifting assembly 46 on one side of the trailer 20. The lifting assembly 46a on the other side of the trailer 20 is identical to lifting assembly 46 except for the differences described herein.

The lifting assembly 46 generally includes a tension channel or bar 110 which extends along the length of the trailer 20 a predetermined distance, a driving assembly 112 to retract the tension bar 110 towards the front end of the trailer 20 and a plurality of elongate, flexible connecting elements 114, such as chains, operatively interengaged with the tension bar 110 and, thus the driving assembly 112, by pulley assemblies 116 and to the deck element 44. The tension bar 110 can be one elongate bar or can be a series of bars bolted together. A mounting flange (not shown) is attached to the inner surface of the side walls 34 for mounting the tension bar 110 thereto. The tension bar 110 slides relative to the mounting flange. An anti-friction pad 115 can be mounted between the top 28 of the trailer 20 and the top of the tension bar 110. The anti-friction pad allows the tension bar 110 to slide easily relative to the walls of the trailer 20.

Each pulley assembly 116 includes a first pulley 120 which is secured to the side wall 34 of the trailer 20 and a second pulley 124 which is secured to the tension bar 110 by a slide member 124. The first and second pulleys 120, 122 are spaced apart from each other a predetermined distance. The first pulley 120 is rotatable with respect to the side wall 34 of the trailer 20. The second pulley 122 is rotatable with respect to the slide member 124.

Each chain 114 is interconnected between each pulley assembly 116 and the deck element 44. Specifically, in each pulley assembly 116, one end of the chain 114 is secured to the side wall 34 of the trailer 20 proximate to the first pulley 120 by suitable means. The chain 114 is looped around the second pulley 122 and then around the first pulley 120. The other end of the chain 114 is secured to the end 108 of the cross beam 98 by suitable means. In the present invention, a chain 114 is preferably used instead of a cable since the chain 114 is pulled around pulleys 120, 122 and is subject to the relatively sharp bend of the small pulleys 120, 122 which a cable may not be able to withstand.

For each pulley assembly 116, a base rail 126 is provided along which the slide member 124 can slide. Each base rail 126 is mounted on the side wall 34 of the trailer 20 by suitable means at a predetermined distance downward from the tension bar 110 which is sufficient to provide space for the slide member 124. The bottom end of the slide member 124 contacts the base rail 126 and slides relative to the base rail 126 when the tension bar 110 is retracted by the driving assembly 112.

The driving assembly 112 includes a threaded screw member 128 connected to an internally threaded nut 130 at generally one end of the screw member 128 and to a DC motor 132 at the opposite end of the screw member 128. The nut 130 is affixed to the tension bar 110 and is fixed against rotation relative to the tension bar 110. The threaded screw member 128 extends a predetermined distance along the length of the trailer 20 and is connected to the tension bar 110 through the nut 130 by thread engagement with the nut 130. The screw member 128 is rotatable with respect to the nut 130.

A ninety degree gear box 134 is connected to the DC motor 132 by a shaft 136. A common shaft 138 is connected to the ninety degree gear box 134 at one end and to a ninety degree gear box 134a at its opposite end. The common shaft 138 runs adjacent to the front wall 30 of the trailer 20. As shown in FIG. 7, in the lifting assembly 46a on the opposite side of the trailer 20, the DC motor 132 is eliminated. The screw member 128a is instead directly connected to the ninety degree gear box 134a which is connected to the common shaft 138. The lifting assembly 46a is driven by the DC motor 132 via the ninety degree gear boxes 134, 134a and the common shaft 138.

Initially, as shown in FIG. 10, the horizontal deck element 44 contacts and rests against the floor 26 of the trailer 20. In this position, the chains 114 are fully extended and extend generally from the floor 26 to the top 28 of the trailer 20.

To raise the deck element 20, the DC motor 132 rotates the screw member 128 on the one side of the trailer 20. The DC motor 132 is driven by suitable, known circuitry (not shown). By action of the ninety degree gear boxes 134 and the common shaft 138, the screw member 128a on the other side of the trailer 20 also rotates. The screw members 128, 128a rotate relative to the fixed nuts 130, 130a which causes the nuts 130, 130a and the affixed tension bars 110, 110a to translate along the length of the screw members 128, 128a due to the thread engagement between the nuts 130, 130a and the associated screw members 128, 128a. On each side of the trailer 20, the slide members 124 slide along the base rails 126 as the tension bars 110 translate. This action causes the chains 114 on each side of the trailer 20 to advance around the respective first and second pulleys 120, 122. Since the end of each chain 114 is secured to the side wall 34, 34a of the trailer 20 proximate to the first pulley 120, the chain 114 is gathered at the top of the trailer 20 and for every foot the tension bars 110, 110a translate, the deck element 44 is raised two feet. The deck element 44 is lowered in the same method. By rotating the screw members 128, 128a in the opposite direction by action of the DC motor 132, the thread engagement causes the tension bars 110, 110a to translate in the opposite direction to which they initially translated.

The deck element 44 can be raised to a variety of positions relative to the side walls 34, 34a of the trailer 20. As shown in FIG. 11, the deck element 44 is raised to the midpoint of the side walls 34, 34a. This allows two levels of cars 90, 92 or the like to loaded into the trailer 20 as shown in FIGS. 5 and 6. As shown in FIG. 12, the deck element 44 is raised to be proximate to the top 28 of the trailer 20. The deck element 44 is shown spaced a distance from the top 28 in FIG. 12 for purposes of illustration. In practice, when the deck element 44 is raised to be proximate to the top 28 of the trailer 20, a minimal amount of space exists between the deck element 44 and the top 28. This allows general freight (not shown) to be loaded into the unobstructed interior space in the trailer 20 since the deck element 44 raised upward and out of the way.

As shown in FIG. 11, when the deck element 44 is raised to approximately the midpoint of the trailer 20, the tension bar 110 has translated along approximately half of the screw member 128. When the deck element 44 is in this position, a set of cars 90 can be loaded on the deck element 44 and a second set of cars 92 can be loaded on the floor 26 of the trailer 20 underneath the deck element 44. For each trailer 20, two sets of cars 90, 92 can be loaded thus efficiently utilizing the space available within the trailer 20.

As shown in FIG. 12, when the deck element 44 is raised to the top 28 of the trailer 20, the tension bar 110 has translated along substantially all of the screw member 128. When the deck element 44 is in this position, general freight can be loaded onto the floor 26 of the trailer 20. The trailer 20 is expanded up higher than a conventional van-type trailer to provide for enough space for the deck element 44 to be proximate to the top 28 of the trailer 20 while leaving sufficient unobstructed room in the trailer 20 to load general freight. Since the floor 26 to top 28 height of the trailer 20 is 110 inches, the deck element 44 is completely out of the way and an unobstructed cargo space is provided for general freight or the like to be loaded into the trailer 20.

When the deck element 44 rests on the floor 26 of the trailer 20, the weight of the deck element 44 is on the floor 26. When the deck element 44 is in a raised position, the amount of weight on the chains 114 is minimized by locking the deck element 44 to the side walls 34, 34a of the trailer 20. To lock the deck element 44 to the side walls 34, 34a of the trailer 20, the ends 108 of the cross beams 98 are attached to the cam bracket members 48 which are secured to the side walls 34, 34a of the trailer 20. The cam brackets 48 can be moved to a variety of positions relative to the side walls 34, 34a of the trailer 20.

Now directing attention to FIGS. 13–15, the bracket member 48 is described. The bracket member 48 projects inwardly from the side walls 34, 34a of the trailer 20 when attached thereto and is detachable therefrom. Each bracket member 48 is made of a suitable rigid, high strength material, such as steel. The bracket member 48 has a lower cam surface 140, an upper cam surface 142 and a flat surface 144 which integrally joins the cam surfaces 140, 142 together. The lower cam surface 140 extends inwardly and upwardly and the upper cam surface 142 extends inwardly and downwardly. The flat surface 144 joins the lower and upper cam surfaces 140, 142 at their innermost points. An aperture 146 is provided proximate to the flat surface 144 for attaching the end 108 of the cross beam 98 thereto. When the end 108 of the cross beam 98 is aligned with the flat portion 144 of the bracket member 48, a latch member 148, such as a pin, is inserted through aligned apertures (not shown) in the cross beam 98 to secure the cross beam 98 to the bracket member 48. A cotter pin 150, or other like suitable means, can be attached to the pin 148 to prevent the pin 148 from slipping out from the aligned apertures in the end 108 of the cross beam 98.

Figure 16:
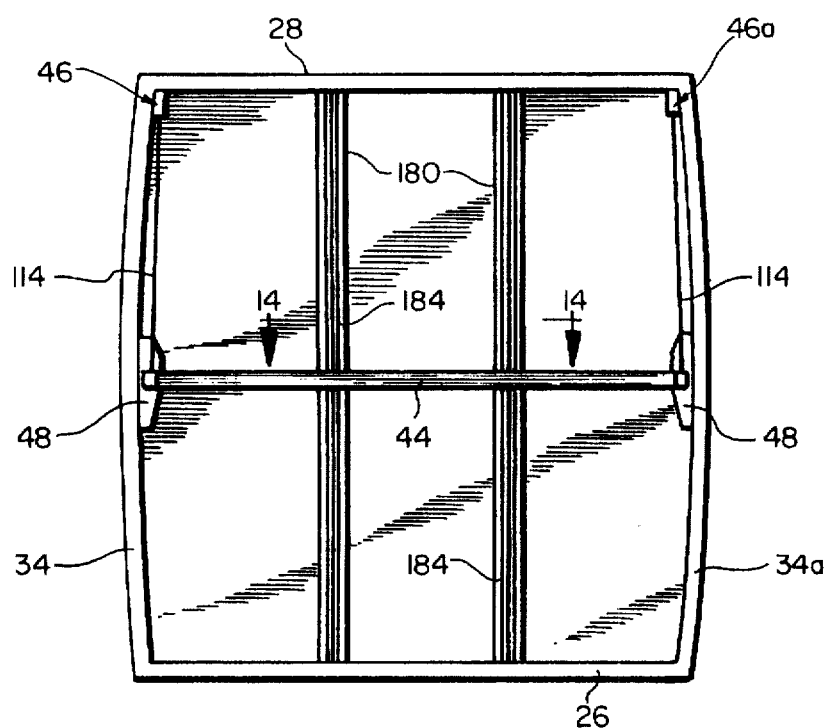
FIG. 16 is a schematic, rear elevational view of the van-type trailer with the deck element raised to approximately the midpoint of the trailer.

The lower cam surface 140 is inclined at a severe angle relative to the vertical axis and provides a surface upon which the end 108 of the cross beam 98 travels when the deck element 44 is lifted by the lifting assembly 46. Since the deck element 44 is only slightly smaller than the width of the trailer 20, as the deck element 44 travels along the lower cam surface 140, the vertical side walls 34, 34a of the trailer 20 bow outwardly and laterally stress outwardly the side walls 34, 34a. When the deck element 44 is placed between the cam brackets 48 on either end 108 of the cross beams 98 with each end 108 of the cross beam 98 engaging a bracket member 48, the vertical side walls 34, 34a maintain the bowed configuration as shown in FIG. 16. When the vertical side walls 34, 34a of the trailer 20 are laterally stressed outwardly, a significant amount of rigidity is added to the structure. The bowing of the side walls 34, 34a spring loads the deck element 44 therebetween and does not allow the deck element 44 to move laterally from side to side. The upper cam surface 142 of the bracket member 48 also provides a surface upon which the end 108 of the cross beam 98 can travel when the deck element 44 is being lowered from a raised position.

As shown in FIGS. 10, 11 and 12, a plurality of spaced openings 152 are provided in a vertical row along the length of the side walls 34, 34a to which the bracket member 48 can be attached. The bracket member 48 and therefore the deck element 44, can be positioned at a variety of heights relative to the floor 26 of the trailer 20.

To attach the bracket member 48 to the openings 152 provided in the side walls 34, 34a of the trailer 20, the bracket member 48 includes an upper hook-shaped dog 154 and a lower hook-shaped dog 156, each of which are spaced from each other and which project outwardly from the surface of the bracket member 48 which is opposite to the cam surfaces 140, 142. Each dog 154, 156 has a length which is slightly smaller than the openings 152 in the side walls 34, 34a. The dogs 154, 156 extend through the openings 152 in the walls 34, 34a and a hook 158, 160 on each dog 154, 156 holds the bracket 48 to the side wall 34, 34a. When the dogs 154, 156 are attached to the walls 34, 34a, a space 157 is provided between the top of the dogs 154, 156 and the top of the opening 152.

To prevent the bracket member 48 from inadvertently detaching from the wall 34, 34a, a locking mechanism 162 for locking the bracket member 48 to the wall 34, 34a is provided on the lower dog 156. The locking mechanism 162 includes a pin 164 which is loaded by a spring 166. The pin 164 diameter is the same as the length of the space 157 between the top of the lower dog 156 and the top of the opening 152 in the side wall 34, 34a. When the bracket 48 is attached to the side wall 34, 34a and the dogs 154, 156 project through the openings 152 in the walls 34, 34a, the pin 164 is between the top of the dog 156 and the top of the opening 152 and fills the space 157. This locks the bracket 48 to the side wall 34, 34a and the bracket 48 cannot be removed from the side wall 34, 34a without unlocking the locking mechanism 162.

The spring 166 has an end which is attached to the pin 164 along the length of the pin 164. The opposite end of the spring 166 is attached to the inner surface of the lower cam surface 140 of the bracket member 48. Normally, the spring 166 biases the pin 164 into a locked position.

To remove the bracket member 48 from the wall 34, 34a, the pin 164 is retracted by pulling the pin 164 backwardly away from the side wall 34, 34a to overcome the biasing force of the spring 166. In the first embodiment of the bracket member 48 shown in FIG. 13, an enlarged opening 168 is provided in the side of the bracket member 48 around the center of the pin 164. A protrusion 170 for an operator's finger is provided along the length of the pin 164. In the second embodiment shown in FIGS. 14 and 15, the finger protrusion 172 extends through an elongated aperture 174 in the side of the cam bracket member 48 and is perpendicular to the pin 164.

To retract the pin 164 in either embodiment, an operator places his or her finger against the protrusion 170, 172 and pulls the pin 164 in a direction away from the side wall 34, 34a of the trailer 20 to overcome the biasing force of the spring 166. The pin 164 is pulled in a direction away from the side wall 34, 34a of the trailer 20 until the pin 164 clears and is removed from the opening 152. When the pin 164 is retracted, the end of the pin 164 which is opposite to the side wall 34, 34a protrudes outwardly from the lower cam surface 140 through an aperture in the surface as shown in FIG. 15. Once the pin 164 clears the opening 152, the bracket member 48 can be removed since there is sufficient clearance for the dogs 154, 156 to be lifted upward and outward with respect to the wall 34, 34a to clear the hook portions 158, 160 of the dogs 154, 156 and remove the dogs 154, 156 from the side wall 34, 34a.

While a locking mechanism 162 is provided only for the lower dog 156, the locking mechanism could be instead provided for only the upper dog 158. Alternatively, a locking mechanism could be provided for both dogs.

Cover plates 176 are mounted on the outer surfaces of the side walls 34, 34a over the openings 152 to prevent the entrance of dirt, moisture or the like into the interior of the trailer 20. Each cover plate 176 is secured to the outer surface of the side wall 34, 34a by suitable means, such as welding or by use of rivets or the like. While two separate cover plates 176 are shown, one single cover plate could be used for each two sets of openings or a single cover plate could cover all of the openings in the side wall.

While the deck element 44 is illustrated and described herein as being positioned against the floor 26 and the top 38 and at the midpoint of the trailer 20, it is to be understood that the deck element 44 can be positioned at a variety of positions relative to the side walls 34, 34a of the trailer 20 by lifting the deck element 44 to a desired position and then securing the ends 108 of the cross beams 98 to the brackets 48. For example, the deck element 44 could be lifted to be three-quarters of the way up the side walls 34, 34a of the trailer 20. This would allow for smaller cargo to be placed on top of the deck element 44 with larger cargo underneath on the floor 26. For example, lawnmowers could be placed on top of the deck element and minivans could be placed underneath the deck element. Thus, if two sets of cars were shipped across country in the trailer 20, once the cars are offloaded from the trailer 20, the deck element 44 can be repositioned to provide space for a variety of cargo, such as the minivans and lawnmowers. Therefore, the trailer 20 does not have to be sent back across country empty since it can be configured to transport other items than cars.

Figure 17:
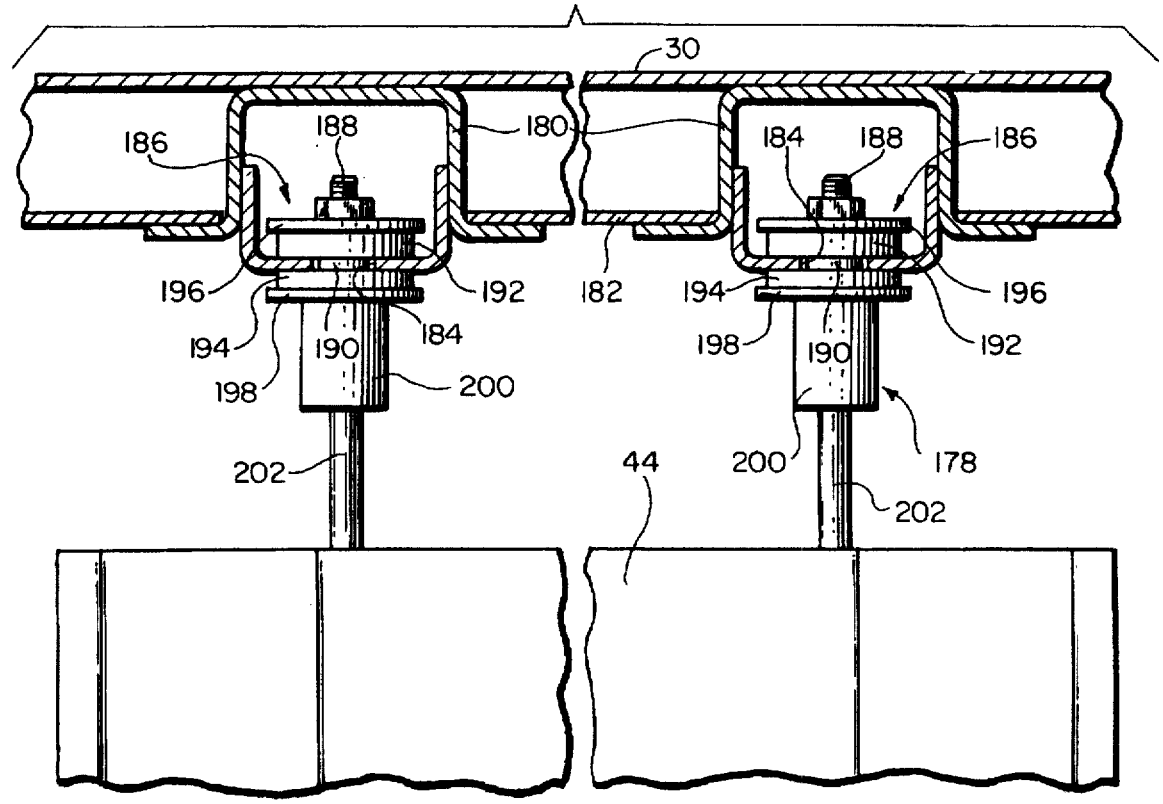
FIG. 17 is a fragmentary, partially cross-sectional view of a fore and aft assembly for preventing forward-and-backward movement of the deck element when the deck element is being raised.

Now directing attention to FIG. 17, a fore and aft deck retaining assembly 178 which is connected to the front end of the deck element 44 is illustrated. The fore and aft deck retaining assembly 178 prevents the deck element 44 from moving forwards towards the front wall 30 of the trailer 20 or backwards towards the end doors 36 during transportation of the trailer 20.

Vertical rails or channels 180 are provided in the nose 182 of the trailer 20 which is adjacent to the front wall 30 of the trailer 20. Each upstanding channel 180 includes a vertical opening 184 along the length of the channel 180. The channel 180 may be made of metal and the nose 182 of the trailer 20 may be made of plywood.

For each vertical channel 180 provided in the nose 182 of the trailer 20, the deck retaining assembly 178 includes a guide assembly 186 which is attached to the vertical channel 180. The guide assembly 186 includes a nylon insert 188 having a first end which is seated inside of the vertical channel 180, a second end which is seated outside of the vertical channel 180 and a middle portion. The middle portion of the nylon insert 188 is enclosed in a slide or anti-friction pad 190 and the combination is seated within the opening 184 in the channel 180. The nylon insert 188 and the surrounding slide pad 190 are approximately the same width as the opening 184 in the vertical channel 180.

A slide or anti-friction pad 192, 194 is attached to the first and second ends of the insert 188. First and second slide plates 196, 198 are attached to the first and second ends of the insert 188, respectively, and abut against the respective slide pads 192, 194. The slide plates 196, 198 are secured to the ends of the insert 188 by suitable means, such as bolts (only one of which is shown). The slide pads 190, 192, 194 used in the fore and aft deck retaining assembly 178 are of a conventional, well-known structure. The slide pads 190, 192, 194 allow the insert 188 to easily slide upwardly and downwardly in the vertical channel 180.

A rigid, stiffener member 200 is attached to the second slide plate 198 around generally the second end of the insert 188. A rigid, tension post member 202 extends from the end of the stiffener member 200 opposite to the one secured to the slide plate 198 to the front end of the deck element 44. The tension post 202 is attached to the plate 198 and the deck element 44 by suitable means, such as by welding. Thus, the fore and aft deck retaining assembly 178 provides a rigid interconnection between the deck element 44 and the nose 182 of the trailer 20 and resists forward and rearward movement of the deck element 44 relative to the floor 26 during transportation of the trailer 20. The fore and aft deck retaining assembly 178 also fixes the distance between the deck element 44 and the nose 182 of the trailer 20 and stabilizes the deck element 44 while it is being raised. When the deck element 44 is raised or lowered by the lifting assembly 46 as described hereinabove, the slide pads 190, 192, 194 allow the insert 188 to slide easily relative to the vertical channel 180.

The novel trailer 20 of the present invention presents several advantages. Since the cargo is only loaded and unloaded once due to the novel trailer 20 capability of being transported by road or by rail, a reduced amount of labor is needed to transport the cargo to the final destination which reduces transportation costs. Also, the possibility of damage to the cargo is also minimized since the cargo is not repeatedly loaded and unloaded. Furthermore, the cargo is transported from the plant to the final destination in a enclosed trailer which also minimizes the possibility of damage to the cargo.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. A vehicle comprising: an elongate enclosure including a floor and upstanding opposite side walls; a highway wheel suspension releasably, lockably mounted beneath said enclosure for adjustment between a first position toward a rear end of the floor and in contact with the ground and a second position adjacent a longitudinal center of gravity of said enclosure and in contact with the ground, said highway wheel suspension including wheels, an air bag between said enclosure and said wheels, and a landing gear mounted beneath said enclosure forwardly of said center of gravity and extendable to the ground for lowering the enclosure relative to said suspension and tilting the enclosure around a fulcrum point formed at said suspension to lower the rear end of the floor towards the ground when said wheel suspension is in said second position and when said suspension is disengaged by releasing air from the air bag; a deck member for receiving and supporting cargo and movable between a lower position and a raised position; and a cam bracket member mounted on at least one of said side walls adjacent; to said raised position of said deck member, said cam bracket member including a lower ramped surface extending inwardly and upwardly relative to said side wall, an upper ramped surface extending inwardly and downwardly relative to said side wall and an intermediate surface extending from and between the innermost point of said lower ramped surface to the innermost point of said upper ramped surface for connecting said lower and upper ramped surfaces together, an opening provided in said cam bracket member for supporting said deck member thereon, said opening spacing said intermediate surface from the side wall to which the cam bracket member is attached, and means on said deck member disposed for engagement with said opening when the deck member is in said raised position, said side walls of said enclosure being laterally outwardly stressed by the engagement of said deck member with said cam bracket member and thereby resisting lateral movement of the deck member.

2. A vehicle as defined in claim 1, wherein said deck member has a latch member thereon for connecting the deck member to the cam bracket member in said raised position.

3. A vehicle as defined in claim 2, wherein said vehicle is a plate trailer.

4. A vehicle as defined in claim 1, further including an upstanding rail secured at a front end of said floor, a guide member mounted on a front end of said deck member and interengageable with said rail for resisting forward and rearward movement of the deck member relative to the floor during transport of said vehicle.

5. A vehicle as defined in claim 1, further including a lift mechanism for raising and lowering said deck member, said lift mechanism comprising a rotatably mounted screw member, a threaded member movable along said screw member upon rotation of the screw member, and a plurality of elongate flexible elements operatively interengaged with said threaded member and connected with said deck member for moving the deck member between said raised and lowered positions.

6. A vehicle as defined in claim 1, wherein said deck member includes means laterally offset towards one side of the deck member for receiving wheels of cargo such as cars or trucks, and a walkway at an opposite side of the deck member for permitting an operator access to and egress from such cargo.

7. A vehicle as defined in claim 1, further including a top and and wherein said deck member is capable of being raised to be proximate to the top of the vehicle so that cargo can be loaded beneath the deck member on the floor of the vehicle.

8. A vehicle as defined in claim 1, wherein said wheel suspension comprises means suitable for traveling over a highway, said vehicle further including means connectable with a rail bogie for attaching the vehicle to the bogie to travel over the rails.

9. A vehicle as defined in claim 1, further including a rear bumper for engaging against the ground when said back end of said trailer approaches the ground.

10. A vehicle as defined in claim 9, further including at least one ramp member which can be selectively positioned between said rear end of said vehicle and the ground to allow cargo to be loaded into the vehicle.

11. A vehicle comprising: an elongate enclosure including a floor and upstanding opposite side walls, a deck member for receiving and supporting cargo and movable between a lower position on said floor and a raised position, a cam bracket member mounted on at least one of said side walls adjacent to said raised position of said deck member, said cam bracket member including a lower ramped surface extending inwardly and upwardly relatives to said side wall, an upper ramped surface extending inwardly and downwardly relative to said side wall and an intermediate surface extending from and between the innermost point of said lower ramped surface to the innermost point of said upper ramped surface for connecting said lower and upper ramped surfaces together, an opening provided in said cam bracket member for supporting said deck member thereon, said opening spacing said intermediate surface from the side wall to which the cam bracket member is attached, and means on said deck member disposed for engagement with said opening when the deck member is in said raised position, said side walls of said enclosure being laterally outwardly stressed by the engagement of said deck member with said cam bracket member and thereby resisting lateral movement of the deck member.

12. A vehicle as defined in claim 11, wherein said vehicle is a plate trailer.

13. A vehicle as defined in claim 11, wherein said bracket member further includes a releasable locking means thereon for selectively securing said bracket member to said side wall.

14. A vehicle as defined in claim 13, wherein said means on said deck member disposed for engagement with said opening comprises: latch members for connecting the deck member in said raised position with said opening; in said bracket member.

15. A vehicle as defined in claim 11, further including a lift mechanism for raising and lowering said deck member, said lift mechanism comprising a rotatably mounted screw member, a threaded member movable along said screw member upon rotation of the screw member, and a plurality of elongate elements operatively interengaged with said threaded member and connected with said deck member for moving the deck member between said raised and lowered positions.

16. A vehicle as defined in claim 15, wherein said enclosure further includes a top and said deck member is movable to be proximate to the top of the enclosure by said lifting mechanism so that general freight can be loaded beneath the deck member on the floor of the enclosure.

17. A vehicle as defined in claim 15, further including an upstanding rail secured at a front end of said vehicle, a guide member mounted on a front end of said deck member and interengageable with said rail for resisting forward and rearward movement of the deck member relative to the floor during transport of said vehicle.

18. A vehicle as defined in claim 13, wherein said side wall of said vehicle has at least one opening therethrough for mounting said bracket member to said side wall, and said releasable locking means comprises at least one dog member which protrudes outwardly from said bracket member and is insertable through said opening to secure said bracket member to said side wall.

19. A vehicle as defined in claim 18, wherein said dog member is insertable through said opening such that a space is formed between said dog member and said side wall of said vehicle, said releasable locking means further including a retractable pin which can be selectively inserted into said space to secure said bracket member to said side wall.

20. A vehicle for hauling freight comprising: a floor, a front wall and side walls extending upwardly from said floor, a deck member for receiving and supporting cargo and movable between various positions relative to said side walls, at least one upstanding rail secured in said front wall, and at least one guide member-mounted on a front end of said deck member and interengageable with said at least one upstanding rail for resisting forward and rearward movement of the deck member relative to the floor.

21. A vehicle as defined in claim 20, further including a cam member mounted on at least one of said side walls adjacent to a raised position of said deck member and means on said deck member engageable with said cam member when the deck member is in said raised position for laterally outwardly stressing said side walls and thereby resisting lateral movement of the deck member.

22. A vehicle as defined in claim 20, further including a lift mechanism for moving said deck member to said various positions relative to said side walls, said lift mechanism comprising a rotatably mounted screw member, a threaded member movable along said screw member upon rotation of the screw member, and a plurality of elongate flexible elements operatively interengaged with said threaded member and connected with said deck member for moving the deck member between said various positions.

23. A vehicle as defined in claim 22, further including brackets secured to said side walls adjacent to a raised position of said deck member, and latch members for connecting the deck member in said raised position with said brackets for supporting the deck member.

24. A vehicle as defined in claim 20, said deck member further includes means laterally offset towards one side of the deck member for receiving wheels of cargo such as cars or trucks, and a walkway at an opposite side of the deck member for permitting an operator access to and egress from such cargo, said walkway extending generally the entire length of said deck member.

25. A vehicle as defined in claim 20, wherein said guide member mounted on said front end of said deck member includes means for preventing disengagement of said guide member from said rail as said deck member is moved to said raised position.

26. A vehicle as defined in claim 25, wherein said at least one rail includes an elongate opening therein, along the length thereof, and said means for preventing disengagement comprises a first pad attached to one side of said rail and a second pad attached to the other side of said rail, said pads being connected to said deck member by a post member.

27. A method of loading an enclosure with cargo comprising the steps of:

providing an enclosure having a floor, opposite side members extending upward, from said floor and a top, a rear end, a suspension releasably, lockably connected to and underneath the enclosure and initially generally proximate to the rear end of the enclosure, said highway wheel suspension including wheels, an air bag between said enclosure and said wheels;

providing a cam bracket member mounted on at least one of said side walls, said cam bracket member including a lower ramped surface extending inwardly and upwardly relative to said side wall, an upper ramped surface extending inwardly and downwardly relative to said side wall and an intermediate surface extending from and between the innermost point of said lower ramped surface to the innermost point of said upper ramped surface for connecting said lower and upper ramped surfaces together, an opening provided in said cam bracket member spacing said intermediate surface from the side wall to which the cam bracket member is attached;

providing a deck element within said enclosure which can be raised and lowered relative to the floor of said enclosure and having means thereon for engagement with said opening in said cam bracket member when the deck member is raised;

driving the enclosure backwards to move the suspension forwardly to finally position the suspension proximate to the center of gravity of the enclosure;

lowering and tilting the rear end of the enclosure towards the ground by releasing air from said air bag on the suspension to cause said enclosure to lower and pivot around said suspension; and loading cargo into said enclosure through the lowered rear end of the enclosure by loading cargo onto said deck element, raising the deck element to a height sufficient to load cargo underneath the deck element, securing said deck element to said cam bracket member mounted on said side walls of said enclosure, said side walls of said enclosure being laterally outwardly stressed by the engagement of said deck member with said cam bracket member and thereby resisting lateral movement of the deck member, and then loading cargo onto the floor of the enclosure beneath the deck element.

28. A method as defined in claim 27, said enclosure further including a landing gear device attached underneath the enclosure forward of the center of gravity of the enclosure and wherein said step of tilting the rear end of the enclosure comprises extending the landing gear device to the ground to cause said enclosure to pivot around said suspension.

29. A method as defined in claim 27, wherein
said step of loading cargo onto the deck element comprises loading the cargo offset to one side of the enclosure; and said step of loading cargo onto the floor of the enclosure beneath the deck element comprises loading the cargo offset to the other side of the enclosure from which the cargo on the deck element is loaded.

30. A method as defined in claim 27, wherein the step of raising the deck element in the enclosure to a height sufficient to load cargo underneath the deck element comprises providing a lifting assembly comprised of a threaded member; a screw member connected to the threaded member and being rotatable with respect to the threaded member; and at least one connecting member connected between the deck element and the threaded member; and rotating the screw member to cause said threaded member to move towards an end of the enclosure to lift said connecting members upwardly to lift the deck element upwardly.

31. A method as defined in claim 27, said enclosure further including means attached underneath the enclosure forward of the center of gravity of the enclosure and wherein said step of tilting the rear end of the enclosure comprises operating said means to cause said enclosure to pivot around said suspension.

32. A method as defined in claim 27, wherein said enclosure is a trailer.

* * * * *

UNITED STATES PATENT AND TRADEMARK OFFICE
CERTIFICATE OF CORRECTION

PATENT NO. : 5,752,798
DATED : May 19, 1998
INVENTOR(S) : Francis S. Smidler

It is certified that error appears in the above-indentified patent and that said Letters Patent is hereby corrected as shown below:

Column 15, Line 37 "relatives" should be -- relative --

Signed and Sealed this

Fifth Day of January, 1999

Attest:

Attesting Officer

*Acting Commissioner of Patents and Trademarks*